US012795333B2

(12) United States Patent
Jeong et al.

(10) Patent No.: US 12,795,333 B2
(45) Date of Patent: Nov. 10, 2026

(54) METHOD AND DEVICE FOR PROVIDING MULTICAST AND BROADCAST SERVICE IN MOBILE COMMUNICATION NETWORK

(71) Applicant: SAMSUNG ELECTRONICS CO., LTD., Suwon-si (KR)

(72) Inventors: Sangsoo Jeong, Suwon-si (KR); Youngkyo Baek, Suwon-si (KR); Jungje Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 732 days.

(21) Appl. No.: 17/753,464

(22) PCT Filed: Sep. 3, 2020

(86) PCT No.: PCT/KR2020/011866
§ 371 (c)(1),
(2) Date: Mar. 3, 2022

(87) PCT Pub. No.: WO2021/045532
PCT Pub. Date: Mar. 11, 2021

(65) Prior Publication Data

US 2022/0329983 A1 Oct. 13, 2022

(30) Foreign Application Priority Data

Sep. 3, 2019 (KR) ........................ 10-2019-0109113

(51) Int. Cl.
*H04H 20/71* (2008.01)
*H04W 4/06* (2009.01)
(Continued)

(52) U.S. Cl.
CPC ............. *H04W 4/06* (2013.01); *H04W 76/10* (2018.02); *H04L 12/189* (2013.01); *H04W 80/10* (2013.01)

(58) Field of Classification Search
CPC ..... H04L 12/189; H04L 12/18; H04L 12/185; H04L 47/806; H04L 49/201;
(Continued)

(56) References Cited

U.S. PATENT DOCUMENTS 10,638,375 B2 4/2020 Jeong et al.
10,791,431 B2 * 9/2020 Livanos ................. H04W 4/08
(Continued)

FOREIGN PATENT DOCUMENTS

CN 101884230 A 11/2010
KR 10-2019-0051051 A 5/2019
(Continued)

OTHER PUBLICATIONS

Office Action issued Nov. 30, 2023, in connection with Chinese Patent Application No. 202080062026.2, 17 pages.
Communication pursuant to Article 94(3) EPC dated Sep. 13, 2024, in connection with European Patent Application No. 20860343.1, 5 pages.
Office Action dated Jul. 24, 2024, in connection with Chinese Patent Application No. 202080062026.2, 20 pages.
(Continued)

*Primary Examiner* — Shantell L Heiber

(57) ABSTRACT

The present disclosure relates to a communication technique for converging IoT technologies with 5G communication systems for supporting a higher data transfer rate beyond the 4G systems, and a system therefor. The present disclosure may be applied to intelligent services (for example, smart homes, smart buildings, smart cities, smart cars or connected cars, health care, digital education, retail businesses, security and safety-related services, etc.) on the basis of 5G communication technologies and IoT-related technologies. The present invention provides a method for providing an MBS service in a communication system.

15 Claims, 11 Drawing Sheets

(51) Int. Cl.

| | |
|---|---|
| ***H04W 76/10*** | (2018.01) |
| *H04L 12/18* | (2006.01) |
| *H04W 80/10* | (2009.01) |

(58) Field of Classification Search

CPC .. H04L 61/5069; H04L 65/611; H04W 76/10; H04W 4/06; H04W 76/40; H04W 12/06; H04W 60/04; H04J 2203/0019

See application file for complete search history.

(56) References Cited

U.S. PATENT DOCUMENTS

| | | | | |
|---|---|---|---|---|
| 10,841,084 | B2 | 11/2020 | Lee et al. | |
| 2010/0265867 | A1 | 10/2010 | Becker et al. | |
| 2015/0373523 | A1 | 12/2015 | Jeong et al. | |
| 2016/0127896 | A1 | 5/2016 | Lee et al. | |
| 2018/0192289 | A1* | 7/2018 | Dao | H04W 12/03 |
| 2019/0158985 | A1* | 5/2019 | Dao | H04W 28/04 |
| 2019/0191467 | A1 | 6/2019 | Dao et al. | |
| 2019/0223017 | A1 | 7/2019 | Lai et al. | |
| 2019/0261260 | A1 | 8/2019 | Dao et al. | |
| 2020/0178048 | A1* | 6/2020 | Kim | H04W 12/062 |
| 2020/0275302 | A1* | 8/2020 | Youn | H04W 28/24 |
| 2020/0344576 | A1* | 10/2020 | Li | H04W 4/06 |

FOREIGN PATENT DOCUMENTS

| | | | |
|---|---|---|---|
| TW | 201832515 | A | 9/2018 |
| WO | 2018066876 | A1 | 4/2018 |
| WO | 2019104358 | A2 | 5/2019 |
| WO | 2019136128 | A1 | 7/2019 |

OTHER PUBLICATIONS

International Search Report and Written Opinion of the International Searching Authority in connection with International Application No. PCT/KR2020/011866 issued Dec. 3, 2020, 14 pages.

Tencent, "Support for Groupcast Traffic Forwarding of a 5G VN", S2-1907545 (Revision of S2-19xxxx), SA WG2 Meeting #134, Jun. 24-28, 2019, Sapporo, Japan, 4 pages.

European Patent Office, "Supplementary European Search Report," dated Sep. 9, 2022, in connection with European Patent Application No. 20860343.1,8 pages.

European Patent Office, "Supplementary European Search Report," dated Oct. 12, 2022, in connection with European Patent Application No. 20860343.1, 11 pages.

3GPP TS 23.502 V0.5.0 (Jul. 2017) Technical Specification; 3rd Generation Partnership Project; Technical Specification Group Services and System Aspects; Procedures for the 5G System; Stage 2 (Release 15); 148 pages.

Office Action issued Dec. 12, 2024, in connection with Korean Patent Application No. 10-2019-0109113, 14 pages.

The Second Office Action issued Dec. 16, 2024, in connection with Chinese Patent Application No. 202080062026.2, 17 pages.

Notification of Fulfilling of Registration Formality dated Mar. 13, 2025 in connection with CN Application No. 202080062026.2, 7 pages.

Office Action dated Aug. 21, 2025, in connection with Korean Application No. 10-2019-0109113, 8 pages.

Communication pursuant to Article 94(3) EPC dated Jul. 15, 2026, in connection with European Application No. 20860343.1, 8 pages.

* cited by examiner

METHOD AND DEVICE FOR PROVIDING MULTICAST AND BROADCAST SERVICE IN MOBILE COMMUNICATION NETWORK

CROSS-REFERENCE TO RELATED APPLICATIONS

This application is a 371 of International Application No. PCT/KR2020/011866, filed Sep. 3, 2020, which claims priority to Korean Patent Application No. 10-2019-0109113, filed Sep. 3, 2019, the disclosures of which are herein incorporated by reference in their entirety.

BACKGROUND

1. Field

The disclosure relates to a device and a method for providing a multicast/broadcast service.

2. Description of Related Art

To meet the demand for wireless data traffic having explosively increased since deployment of 4G communication systems and increases of multimedia services, efforts have been made to develop an improved 5G or pre-5G communication system. Therefore, the 5G or pre-5G communication system is also called a "beyond 4G Network" communication system or a "post LTE" system. The 5G communication system is considered to be implemented in ultra-higher frequency (mmWave) bands (e.g., 60 GHz bands) so as to increase data rates. To decrease propagation loss of the radio waves and increase the transmission distance in the ultra-higher frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology. In order to transmit the same data to a plurality of terminals clustered in a specific area in a mobile communication network, data may be transmitted to each terminal via unicast, but for resource efficiency, it is necessary to provide data services via multicast/broadcast.

SUMMARY

In order to transmit the same data to a plurality of terminals clustered in a specific area in a mobile communication network, it is necessary to provide services via multicast/broadcast. For example, in order to provide a media service (e.g., a TV/audio service), a vehicle to everything (V2X) service, or a massive cellular Internet of things (CIoT) service to a plurality of terminals in a specific area, a method of transmitting data via multicast/broadcast is required, and to this end, information on a service currently transferred via multicast/broadcast between terminals and a network and a service authentication procedure should be provided. The disclosure proposes an effective control method for providing a 5G-based multicast/broadcast service to a terminal.

A method performed by a session management function (SMF) in a wireless communication system according to an embodiment of the disclosure may include: receiving, from a terminal, a first message including information on a request for establishing a protocol data unit (PDU) session for a multicast broadcast service (MBS); transmitting, to an application server (AS), a second message including information for requesting authentication for the PDU session; receiving a third message from the AS as a response to the second message; and transmitting a fourth message including information on the MBS to the terminal.

The transmitting of the second message may include: receiving a fifth message including subscription information of the terminal from a unified data management (UDM); and transmitting the second message to the AS, based on the subscription information, wherein the subscription information includes at least one of information for the MBS, information on whether the MBS is authorized for a subscriber, user identifier information to be used for the MBS, information on whether an MBS data network name (DNN) is authorized, or identifier information of the AS.

The second message may include current location information of the terminal or user identifier information to be used for the MBS.

The fourth message may include at least one of identifier information of the MBS, slice identifier information corresponding to the MBS, key information of the MBS, multicast Internet protocol (IP) address information of an MBS server, or service session start time information of the MBS.

A method performed by a terminal in a wireless communication system according to another embodiment of the disclosure may include: transmitting, to a session management function (SMF), a first message including information on a request for establishing a protocol data unit (PDU) session for a multicast broadcast service (MBS); and in case that an application server (AS) successfully performs authentication for the PDU session, receiving a second message including information on the MBS from the SMF.

The authentication for the PDU session may be performed based on subscription information of the terminal, which is received from a unified data management (UDM).

The first message may include at least one of data network name (DNN) information for the MBS, identifier information for the MBS, or information on authentication and authorization (AA) for the MBS.

The second message may include at least one of identifier information of the MBS, slice identifier information corresponding to the MBS, key information of the MBS, multicast Internet protocol (IP) address information of an MBS server, or service session start time information of the MBS.

An SMF in a wireless communication system according to another embodiment of the disclosure may include: a transceiver; and a controller configured to receive, from a terminal via the transceiver, a first message including information on a request for establishing a protocol data unit (PDU) session for a multicast broadcast service (MBS), transmit, to an application server (AS) via the transceiver, a second message including information for requesting authentication for the PDU session, receive a third message from the AS via the transceiver in response to the second message, and transmit a fourth message including information on the MBS to the terminal via the transceiver.

A terminal in a wireless communication system according to another embodiment of the disclosure may include: a transceiver; and a controller configured to transmit, to a session management function (SMF) via the transceiver, a first message including information on a request for establishing a protocol data unit (PDU) session for a multicast broadcast service (MBS), and in case that an application server (AS) successfully performs authentication for the PDU session, receive a second message including information on the MBS from the SW' via the transceiver.

According to an embodiment of the disclosure, a 5G-based multicast/broadcast service may be provided to a terminal.

DETAILED DESCRIPTION

Figure 1:
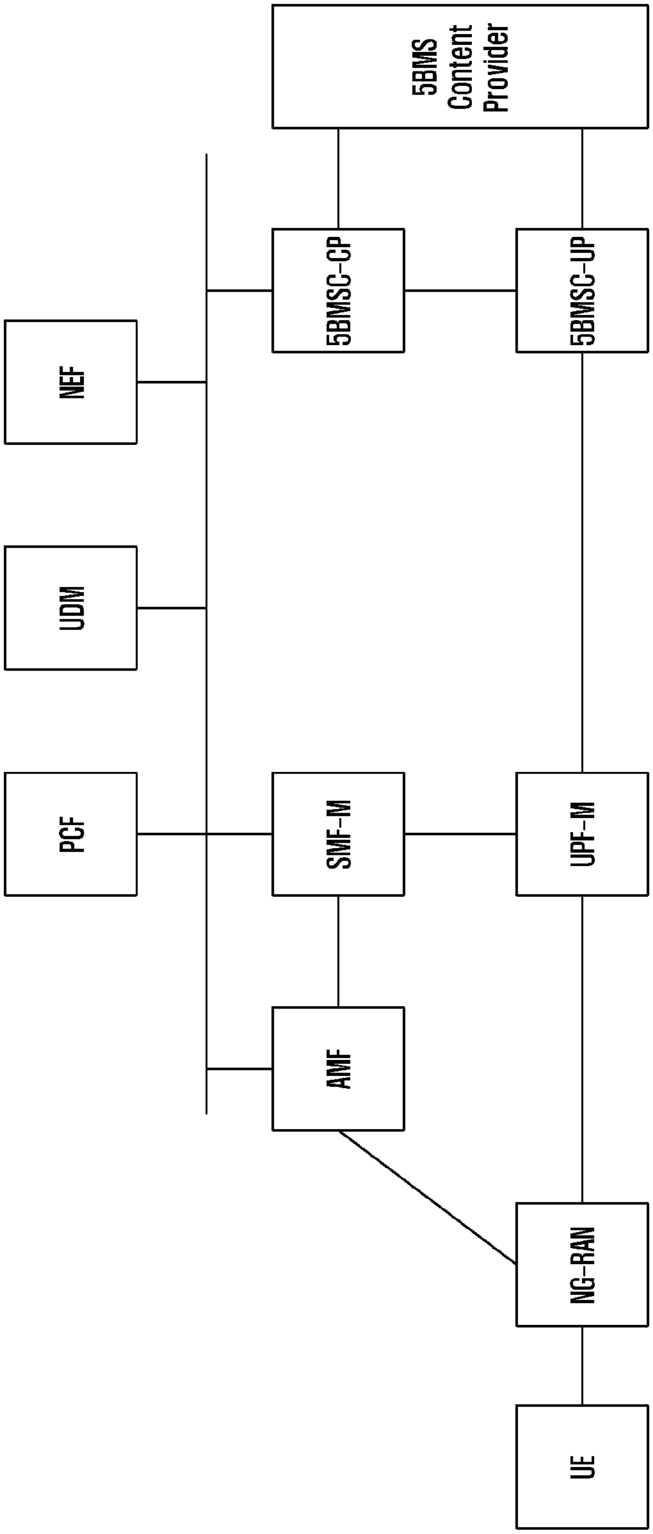
FIG. 1 is a diagram illustrating a 5G system structure according to an embodiment of the disclosure.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the “unit” refers to a software element or a hardware element, such as a Field Programmable Gate Array (FPGA) or an Application Specific Integrated Circuit (ASIC), which performs a predetermined function. However, the “unit” does not always have a meaning limited to software or hardware. The “unit” may be constructed either to be stored in an addressable storage medium or to execute one or more processors. Therefore, the “unit” includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the “unit” may be either combined into a smaller number of elements, or a “unit”, or divided into a larger number of elements, or a “unit”. Moreover, the elements and “units” or may be implemented to reproduce one or more CPUs within a device or a security multimedia card. Further, the “unit” in the embodiments may include one or more processors.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. The following description of the disclosure is directed to technology for receiving broadcast information from a base station by a terminal in a wireless communication system. The disclosure relates to a communication technique for converging IoT technology with a 5th generation (5G) communication system designed to support a higher data transfer rate beyond the 4th generation (4G) system, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

As used in the following description, terms referring to broadcast information, terms referring to control information, terms related to communication coverage, terms referring to state changes (e.g., events), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

As used in the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description of the disclosure, terms and names defined in the 5G system standards will be used for the convenience of description. However, the disclosure is not limited by these terms and names, and may be applied in the same way to systems that conform other standards.

FIG. 1 is a diagram illustrating a 5G system structure according to an embodiment of the disclosure.

Referring to FIG. 1, a 5G system may include a user equipment (UE), a next generation (NG)-radio access network (RAN), an access and mobility management function (AMF), a session management function (SMF)-M, a user plane function (UPF)-M, a policy control function (PCF), a unified data management (UDM), a network exposure function (NEF), a 5G broadcast/multicast service center (5BMSC), and/or a 5G MBS (5MBS) content provider.

A UE refers to a terminal (user terminal), and may include, for example, a terminal capable of receiving an MBS service and/or a general unicast communication-based service.

An NG-RAN is a base station that provides a wireless communication function by interworking with the 5G system, and may include a base station using NR (new radio) and/or a base station supporting E-UTRA.

An AMF is a network function (NF) that manages wireless network access and mobility for a terminal (UE).

An SMF is an NF that manages a session for a terminal, and session information includes QoS information, charging information, and packet processing information.

A UPF is an NF that processes user plane traffic, and is controlled by an SMF.

In an embodiment of the disclosure, it is described that, among functions of an existing MBMS-GW for providing an MBS, a control plane part is accommodated in an SMF so as to be configured to an SMF-M, and a user plane part among the MBMS-GW functions is accommodated in a UPF so as to be configured to a UPF-M. In this case, the SMF-M and the UPF-M may support both processing of an existing unicast communication-based service and processing of an MBS. In this specification, an SMF supporting both processing of a unicast communication-based service and processing of an MBS is referred to as an SMF-M to distinguish the same from an SMF supporting only processing of a unicast communication-based service, but both may be collectively referred to as an SMF. Similarly, an UPF supporting both processing of a unicast communication-based service and processing of an MBS is referred to as a UPF-M to distinguish the same from a UPF supporting only processing of a unicast communication-based service, but both may be collectively referred to as a UPF.

5BMSC may support authentication for an MBS, interworking with an external MBS content provider, and content delivery. In an embodiment of the disclosure, 5BMSC may also be divided into a control plane function (5BMSC-CP) and a user plane function (5BMSC-UP).

Depending on an embodiment, an SMF-M may be divided into an SMF that processes unicast communication (a unicast communication-based service) and an MBSMF that processes an MBS, and a UPF-M may be divided into a UPF that processes unicast communication and an MBUPF that processes an MBS. This will be described below with reference to FIG. 2.

Figure 2:
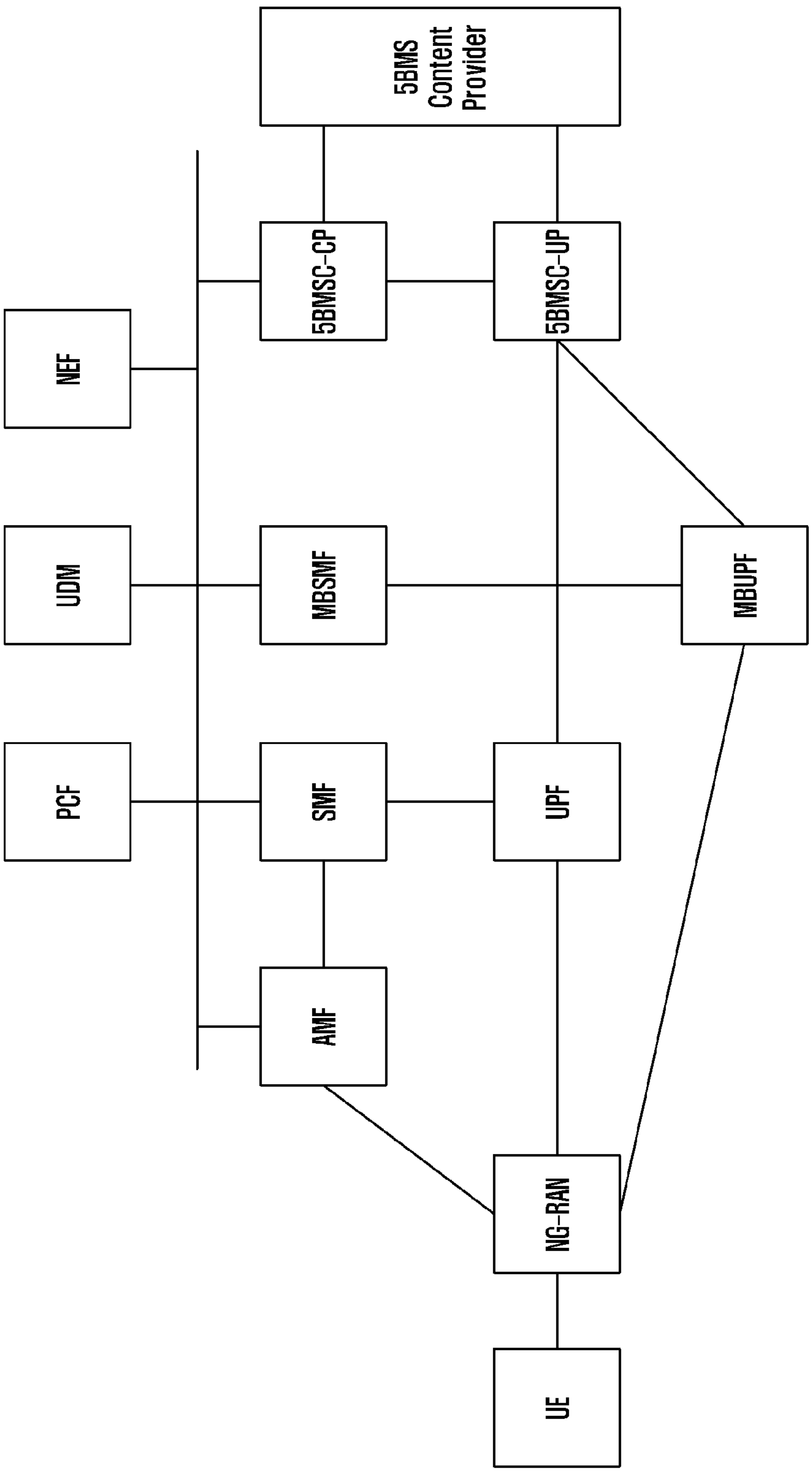
FIG. 2 is a diagram illustrating the 5G system structure according to another embodiment of the disclosure.

FIG. 2 is a diagram illustrating a 5G system structure according to another embodiment of the disclosure.

Referring to FIG. 2, the 5G system may include a user equipment (UE), a new generation (NG)-radio access network (RAN), an access and mobility management function (AMF), a session management function (SMF), an MBSMF, a user plane function (UPF), an MBUPF, a policy control function (PCF), a unified data management (UDM), a network exposure function (NEF), a 5G broadcast/multicast service center (5BMSC), and/or a 5MBS content provider. That is, the 5G system may further include an MBSMF and an MBUPF for processing an MBS.

Figure 3:
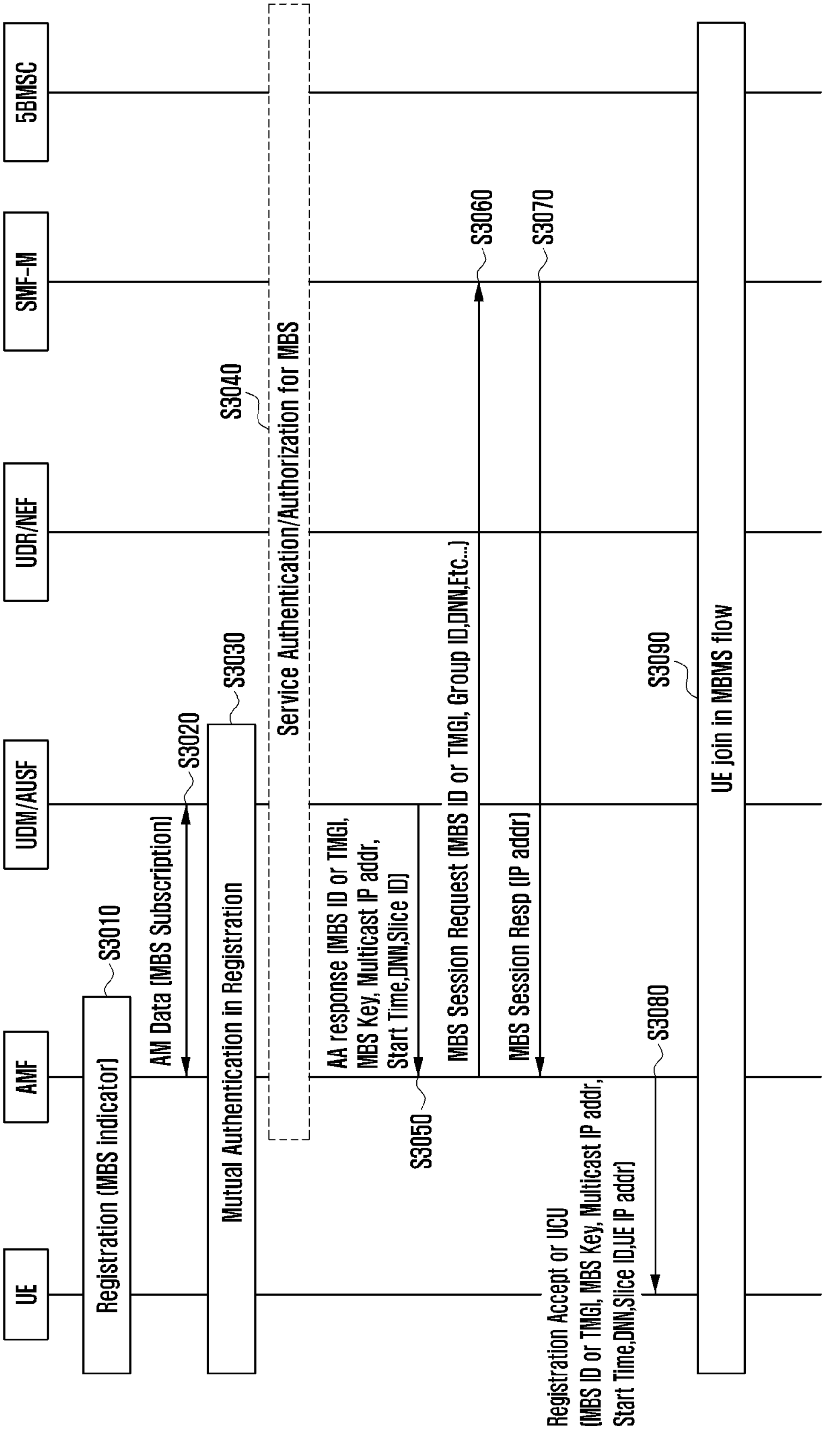
FIG. 3 illustrates a procedure for MBS service authentication and service information transfer with respect to the terminal according to an embodiment of the disclosure.

In the structure of FIG. 1 and FIG. 2, in order for the control plane to control the user plane, a rule to be used when the control plane processes user plane traffic (or packet) may be generated and transferred to the user plane. For example, in the structure of FIG. 1, which includes the SMF-M and the UPF-M, the SMF-M generates a rule for packet processing for the MBS as well as processing for unicast traffic, and transfers the generated rule to the UPF-M. For another example, in the structure of FIG. 2, in which the MBSMF and the MBUPF operate separately from the SMF and the UPF, a rule for controlling unicast traffic is generated and transferred to the UPF by the SMF, and a rule for controlling MBS traffic is generated and transferred to the MBUPF by the MBSMF FIG. 3 illustrates a procedure for MBS service authentication and service information transfer with respect to the terminal according to an embodiment of the disclosure.

Operation S3010. A terminal (UE) performs a procedure for registering with a network, and the procedure starts with transmitting, by the terminal, a registration request message to an AMF. The terminal may include, in the request message, information (e.g., an MBS indicator) indicating whether an MBS or 5G MBS (5MBS) is supported, so as to inform the network whether the terminal itself supports the MBS or 5MBS. If the terminal has information (e.g., a service identifier or slice information, etc.) on an MBS service that the terminal itself wants to receive, this may be specified in the request message so as to be transmitted.

Operation S3020. The AMF uses subscription information (subscription data) of the terminal to process the registration request of the terminal. The subscription information of the terminal may be stored in the AMF if the terminal has already been registered with the network, or may be stored as a part of UE context received from another AMF/MME. Alternatively, if the procedure is to process new registration, the AMF receives subscription information from a UDM (or HSS). If a business operator performs MBS control based on subscription information, the subscription information may include MBS service information for a subscriber, and this information may include one or more among whether the MBS service is authorized, basic information (e.g., a temporary mobile group identity (TMGI), service URL, etc.) on the MBS service, a data network name (DNN) associated with the MBS service, and an NW slice ID associated with the MBS service.

Operation S3030. The registration procedure is performed, and during the procedure, the subscriber may be authenticated for access to a 3GPP network.

Operation S3040. If an additional authentication/authorization procedure (service authentication/authorization) for the MBS is required for the subscriber, the procedure may be performed using information exchange between the AMF, an authentication server function (AUSF), and a 5BMSC (or a separate authentication authorization accounting (AAA) server), and a procedure of exchanging authentication information with the terminal may be performed when necessary. During this procedure, when the authentication request is transmitted to the AUSF, the AMF may transfer, to the AUSF, MBS-related information (e.g., an MBS service identifier, etc.) among the information received from the terminal and the subscription information received from the UDM.

Operation S3050. The AMF receives an MBS security key (MBS service key) to be transferred to the terminal for each MBS (i.e., for each MBS identifier) provided by the network. If operation S3040 is performed, reception of the MBS key may be performed during operation S3040. An identifier for a specific MBS provided by the network may be a TMGI or a multicast broadcast service (MBS) ID. During this procedure, if an MBS service-related parameter, a multicast IP address of an MBS server, a service session start time, or packet transmission associated with the MBS service is required, when an MBS service control in units of data network names (DNN) and/or slices to be used by the terminal is applied, an identifier (S-NSSAI or single-network slice selection assistance information) of an MBS slice may be included. Alternatively, the MBS server may operate as an AS to transfer or receive information for providing of the MBS service to the 5G system in the form of a policy through a PCF. In this case, the MBS server may directly exchange information with the PCF, or may exchange the information with the PCF through an NEF, and the PCF may transfer the information again to another NF of 5GC in the form of a policy.

Operation S3060. If it is necessary to assign, to the terminal, an IP address for reception of an IP multicast (broadcast) packet, the AMF may assign an IP address to the terminal, and if there is an IP address stored in the AMF, the stored IP address may be used, or IP address assignment may be requested (MBS session request) from an NF (SMF-M or MBSMF) that manages a session for the MBS. In this case, the IP address to be assigned to the terminal may be assigned differently according to each MBS service, each subscriber, and a group to which a specific subscriber belongs. To this end, the message for requesting IP address assignment by the AMF may include one or more pieces of the aforementioned information (e.g., the MBS ID, TMGI, group ID, DNN, etc.).

Operation S3070. If the AMF requests IP address assignment from the NF (SMF-M or MBSMF) that manages an MBS session, the NF having received the request may determine an IP address to be assigned to the terminal by using the subscriber/terminal information included in the request message (for each MBS service, for each subscriber, and for a multicast group to which a specific subscriber belongs) and may make a response using the IP address (MBS session response). In this case, the IP address assigned to the terminal, which is included in the response (response message), may be configured differently for each MBS service, for each subscriber, and for each multicast group to which a specific subscriber belongs.

Operation S3080. The AMF transfers information for the MBS to the terminal by using a non-access stratum (NAS) message. For example, if the registration procedure started in operation S3010 is not completed, the AMF may transfer the information to the terminal by using a registration accept message. Alternatively, if the registration procedure is completed before performing operation S3080, the AMF may transfer the information to the terminal via a UE configuration update (UCU) procedure. The information transferred to the terminal may include at least one among the MBS identifier allowed for the terminal, the slice identifier corresponding to the specific MBS, the MBS service key, the IP address to be used by the terminal, the transmission start time, the IP address of the multicast transmission server, and the DNN to be used by the terminal when packet transmission associated with the MBS service is required.

Operation S3090. The terminal performs a procedure for receiving MBS transmission, by using the received information.

Figure 4:
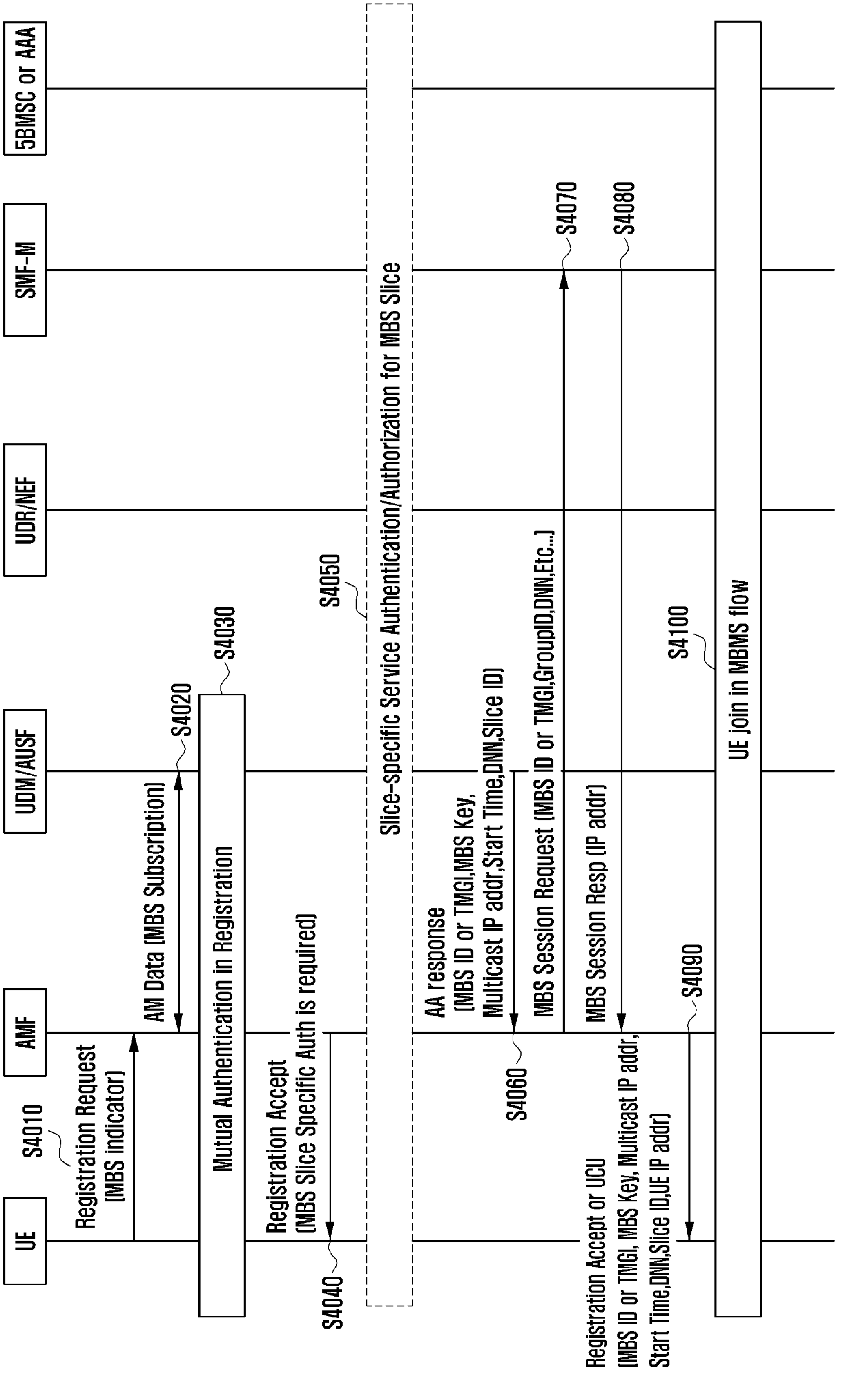
FIG. 4 is a diagram illustrating a procedure for supporting subscriber authentication/authorization for an MBS according to an embodiment of the disclosure.

FIG. 4 is a diagram illustrating a procedure for supporting subscriber authentication/authorization for an MBS according to an embodiment of the disclosure.

Operation S4010. A terminal (UE) performs a procedure for registering with a network, and the procedure starts with transmitting, by the terminal, a registration request message to an AMF. The terminal may include, in the request message, information (e.g., an MBS indicator) indicating whether an MBS or 5MBS is supported, so as to inform the network whether the terminal itself supports the MBS or 5MBS. If the terminal has information (e.g., a service identifier or slice information, etc.) on an MBS service that the terminal itself wants to receive, this may be specified in the request message so as to be transmitted.

Operation S4020. The AMF uses subscription information (subscription data) of the terminal to process the registration request of the terminal. The subscription information of the terminal may be stored in the AMF if the terminal has already been registered with the network, or may be stored as a part of UE context received from another AMF/MME. Alternatively, if the procedure is to process new registration, the AMF receives subscription information from a UDM (or HSS). If a business operator performs MBS control based on subscription information, the subscription information may include MBS service information for a subscriber, and this information may include one or more among whether the MBS service is authorized, basic information (e.g., a TMGI, a service URL, etc.) on the MBS service, a DNN associated with the MBS service, and an NW slice ID associated with the MBS service.

Operation S4030. The registration procedure is performed, and during the procedure, the subscriber may be authenticated for access to a 3GPP network.

Operation S4040. The AMF transfers a message (registration accept) notifying that registration has been allowed to the terminal. If a 5MBS is provided by a specific slice, and an additional authentication procedure is required for this, the AMF may include an indication that an additional authentication procedure for the slice is in progress (or required), while transferring a registration accept message to the terminal.

Operation S4050. The AMF performs a slice-specific authentication/authorization procedure for the MBS slice. For example, if the indication indicating that additional authentication for the MBS slice is required is included in the registration accept message, the AMF may perform an authentication/authorization procedure (slice authentication/authorization procedure) for the MBS slice. During this procedure, the AMF may inform, while transferring an NAS MM transport message to the terminal, that a slice identifier (S-NSSAI) for the MBS slice and an identifier (extensible authentication protocol (EAP) ID) for MBS authentication of the terminal are requested. In addition, the AMF may include an MBS identifier (e.g., a TMGI, etc.) indicating a specific MBS in the NAS MM transport message. In response to this, the terminal transmits, to the AMF, the NAS MM transport message including the slice identifier and a subscriber identifier response for the MBS. If it is required to refer to a specific MBS, the terminal may include an MBS identifier in the NAS MM transport message. The AMF then performs authentication/authorization for the MBS slice with an AAA server via an AUSF. In this case, when authentication/authorization is additionally requested for the specific MBS among MBSs which can be provided in the MBS slice, the AMF may transfer a message including an MBS identifier, or if service provision is authorized only for the specific MBS, the AAA server may inform the AMF and the terminal about this by including the MBS identifier in a response message. The AMF transfers an EAP message received via the AUSF to the terminal. During this procedure, the terminal may receive one or more pieces of additional information for the MBS service (e.g., whether the MBS service is authorized, basic information on the MBS service (a TMGI, a service URL, etc.), an MBS key, a DNN associated with the MBS service, an NW slice ID associated with the MBS service, a multicast IP address of an MBS server, and a service session start time) via the EAP message received from the network. If the AMF of the terminal needs to be changed or the slice information of the terminal needs to be updated via the additional authentication procedure for the slice, the AMF may transfer information to the terminal by using a UE configuration update (UCU) procedure. If authentication for the MBS slice fails, and when the slice selected and requested to be accessed by the terminal is only the MBS, or the terminal access is not allowed for a slice other than the MBS slice, the AMF may perform a procedure for de-registration of the terminal.

Operation S4060. If detailed MBS information is not transferred to the terminal via the slice authentication/authorization procedure, the AMF may perform a subsequent operation to transfer additional information for the MBS to the terminal. The AMF receives an MBS security key (or an MBS service key) to be transferred to the terminal for each MBS (i.e., for each MBS identifier) provided by the network. An identifier for a specific MBS provided by the network may be a TMGI or a multicast broadcast service (MBS) ID. The AMF may receive information for the MBS service, whether the MBS service is authorized, the DNN associated with the MBS service, the NW slice ID associated with the MBS service, the multicast IP address of the MBS server, and/or the service session start time. Alternatively, the MBS server may operate as an AS to transfer or receive information for providing of the MBS service to the 5G system in the form of a policy through a PCF. In this case, the MBS server may directly exchange information with the PCF, or may exchange the information with the PCF through an NEF, and the PCF may transfer the information again to another NF of 5GC in the form of a policy.

Operation S4070. If it is necessary to assign, to the terminal, an IP address for reception of an IP multicast (broadcast) packet, the AMF may assign an IP address to the terminal, and if there is an IP address stored in the AMF, the stored IP address may be used, or IP address assignment may be requested (MBS session request) from an NF (SMF-M or MBSMF) that manages a session for the MBS. In this case, the IP address to be assigned to the terminal may be assigned differently according to each MBS service, each subscriber, and a group to which a specific subscriber belongs. To this end, the message for requesting IP address assignment by the AMF may include one or more pieces of the aforementioned information (e.g., the MBS ID, TMGI, group ID, DNN, etc.).

Operation S4080. If the AMF requests IP address assignment from the NF (SMF-M or MBSMF) that manages an MBS session, the NF having received the request may determine an IP address to be assigned to the terminal by using the subscriber/terminal information included in the request message (for each MBS service, for each subscriber, and for a multicast group to which a specific subscriber belongs) and may make a response using the IP address (MBS session response). In this case, the IP address assigned to the terminal, which is included in the response (response message), may be configured differently for each MBS service, for each subscriber, and for each multicast group to which a specific subscriber belongs.

Operation S4090. The AMF may transfer information for the MBS to the terminal by using an NAS message. For example, if the registration procedure started in operation S4010 is not completed, the AMF may transfer the information to the terminal by using a registration accept message. Alternatively, if the registration procedure is completed before performing operation S4090, the AMF may transfer the information to the terminal via the UE configuration update (UCU) procedure. The information transferred to the terminal may include at least one among the MBS identifier allowed for the terminal, the slice identifier corresponding to the specific MBS, the MBS service key, the IP address to be used by the terminal, the transmission start time, the DNN to be used if a separate session with the MBS server needs to be established, and the IP address of the multicast transmission server. Depending on an embodiment, this process may be performed in combination with the UCU performed at the end of operation S4050 to update final terminal slice information according to slice authentication.

Operation S4100. The terminal may perform a procedure for receiving MBS transmission, by using the received information.

Figure 5:
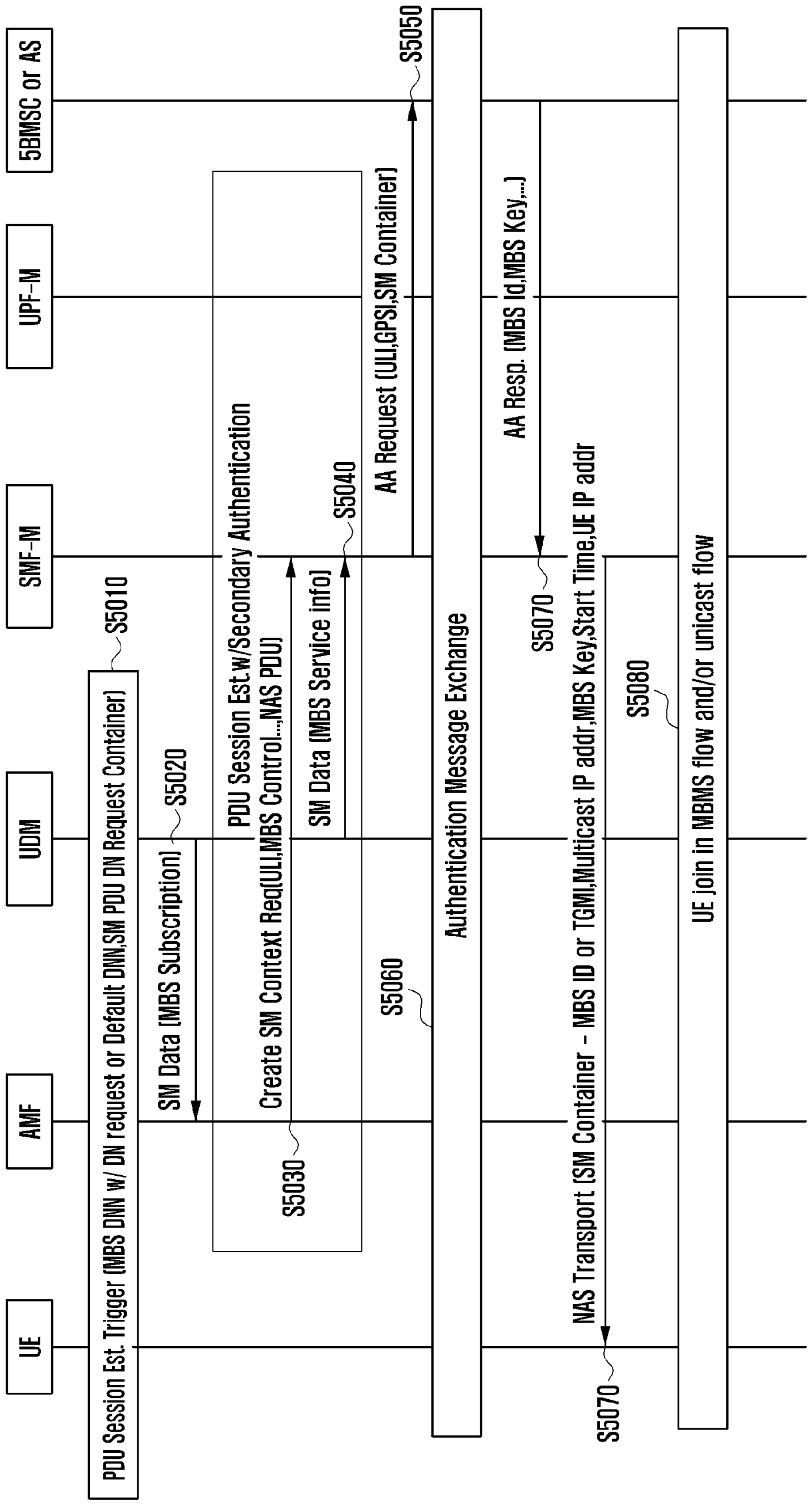
FIG. 5 is a diagram illustrating a procedure for MBS service authentication and terminal control according to an embodiment of the disclosure.

FIG. 5 is a diagram illustrating a procedure for MBS service authentication and terminal control according to an embodiment of the disclosure.

Operation S5010. A terminal (UE) starts a procedure for establishing (configuring, generating) a protocol data unit (PDU) session for an MBS service, when necessary, for initial access to the MBS service or service reception. The terminal transmits a PDU session establishment request (PDU session configuration (generation) request message) to an SMF (SMF-M in this embodiment) via an AMF, and the message may include a DNN (MBS DNN) configured for the MBS service, or may include an identifier indicating that the session is for the MBS service. The message may also include additional information (e.g., an SM PDU DN request container) for secondary authentication/authorization for the MBS service.

Operation S5020. The AMF receives the request message from the terminal and, if necessary, receives, from a UDM, subscription information/data of the terminal and information for SMF selection. The subscription information may include information for controlling of the MBS service, whether the MBS service is authorized for a subscriber, whether the MBS DNN is authorized for the subscriber, and the like. The AMF selects an SMF for providing the MBS service by using UE context, subscription information, and information included in the request message of the terminal.

Operation S5030. The AMF transmits a request message (create SM context request) for generation of a PDU session to the selected SMF. The create SM context request transmitted by the AMF may include the PDU session generation request message transmitted by the terminal and information (e.g., a DNN, a PDU, a session ID, etc.) for session generation, and may include current location information of the terminal (user location information) and/or information for controlling of the MBS service.

Operation S5040. The SMF may process the session generation request received from the AMF, and during this procedure, the subscription information for the corresponding subscriber may be received from the UDM. The subscription information received by the SMF may include not only basic session information but also information for the MBS service, whether the MBS service is authorized for the subscriber, a user identifier (generic public subscription identifier (GPSI)) for each service to be used for the MBS service, whether the MBS DNN is authorized for the subscriber, and/or an identifier (e.g., a name, an address, etc.) of an application server (AS) for interworking a subscribed MBS service.

Operation S5050. The SMF performs secondary authentication/authorization on the session by using the subscription information and the session generation request made by the terminal. The SMF generates an authentication and authorization request message (AA request), and transmits the same to a server (a 5BMSC or a separate application server (AS)) that provides the MBS service via the UPF (UPF-M in this embodiment). The request message transmitted by the SMF may include the SM PDU DN request received from the terminal, and may include the current location information of the terminal (user location information). The request message transmitted by the SMF may include the user identifier (GPSI) of the MBS service with respect to the subscriber.

Operation S5060. The authentication/authorization procedure is performed between the terminal and the server (the 5BMSC or the separate application server) which provides the MBS service. During this procedure, the server and the terminal exchange messages (e.g., an SM PDU DN container) for authentication, via the SMF (authentication message exchange). During this process, if a location-based service control is required, the MBS server may determine whether to allow the service in consideration of a received current location of the terminal, or may determine and transfer a service parameter in consideration of the location.

Operation S5070. If the server finally accepts the request for secondary authentication and authorization for an MBS user, an authentication and authorization response message (AA response) for notification of the success of the authentication is transmitted, and the message may include information for the MBS service. Information transferred to the terminal may include one or more among an MBS identifier allowed for the terminal, a slice identifier corresponding to a specific MBS, an MBS service key, an IP address to be used by the terminal, a transmission start time, and an IP address of a multicast transmission server. This information may be included in, for example, DN authorization data included in the response message so as to be transmitted to the terminal.

Operation S5080. The terminal performs a procedure for receiving MBS transmission, by using the received information.

Figure 6:
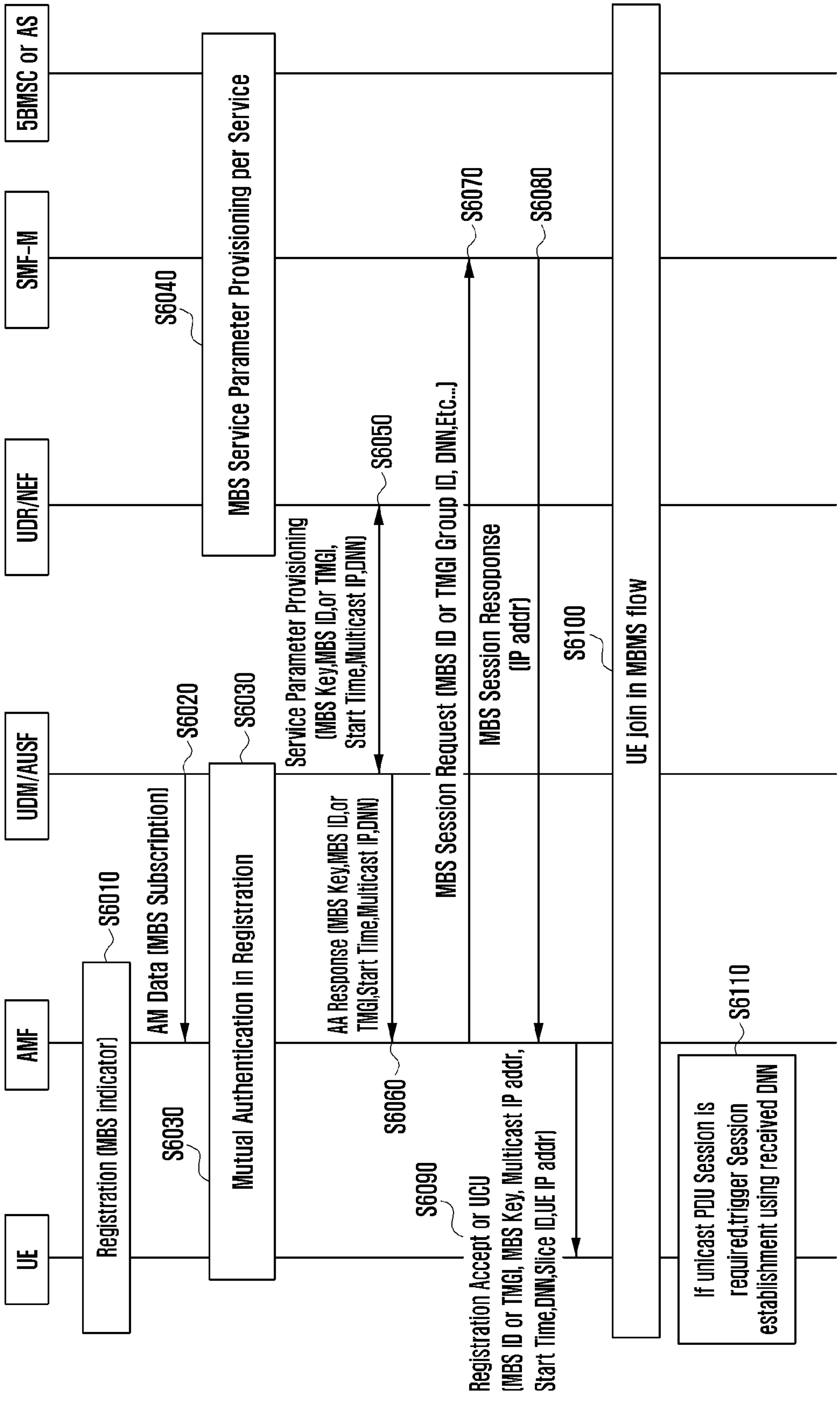
FIG. 6 is a diagram illustrating operations of a terminal and a network according to an embodiment of the disclosure.

FIG. 6 is a diagram illustrating operations of a terminal and a network according to an embodiment of the disclosure.

Operations S6010 to S6030 of FIG. 6 are the same as operations S3010 to S3030 of FIG. 3. Accordingly, duplicate descriptions will be omitted.

Operation S6040. A server (MBS server) (e.g., a 5BMSC or a separate application server (AS)) that provides an MBS service registers information for service provision in the 5G system. This procedure may be performed by the MBS server as a service exposure function via an NEF, for example, the MBS server may call a service (Nnef) of the NEF and transfer, to the NEF, a parameter for service provision. The Nnef service used by the MBS server may be, for example, Nnef_AFsessionWithQoS for generation of a session for transmitting or receiving information between the MBS server and the NEF, or may be Nnef_serviceParameter or Nnef_ParameterProvision for the MBS server to transfer service-related parameters. In this case, the MBS server operates as an AF (application function) for the NEF. The NEF may directly store and use information received from the MBS server, may store the information in a unified data repository (UDR) and use the same as necessary, or may cause another NF to view the information. The information on the MBS service may include one or more among an MBS service identifier (e.g., a TMGI), an MBS security key, a service session start time, an IP address to be used for multicast transmission, and a DNN to be used when unicast transmission is required together. If a location-based MBS service control is required, the MBS service information may be configured differently for each piece of specific location information (e.g., information enabling identification of a location, such as a cell identifier, a tracking area identifier, or GPS information). Alternatively, the MBS server may operate as an AS to transfer or receive information for providing of the MBS service to the 5G system in the form of a policy through a PCF. In this case, the MBS server may directly exchange information with the PCF, or may exchange the information with the PCF through the NEF, and the PCF may transfer the information again to another NF of 5GC in the form of a policy.

Operation S6050. During the registration, if an authentication procedure occurs, and an AUSF receives an authentication request for a subscriber or the MBS service, the AUSF may transmit, to the UDR, a request for receiving a service parameter related to the MBS. The requesting message by the AUSF may include an identifier of the MBS service to be a target, an identifier of the subscriber, and/or an identifier of an MBS service user. If a location-based service control is required, the AUSF may also transfer current location information of the terminal, which is received from the AMF. The NEF or UDR having received the request determines the validity of the request, and if it is possible to provide the MBS service to the corresponding subscriber/user, the information on the MBS service described in operation S6040 is loaded and transmitted in a response message. If the location-based service control is required, MBS service information may be determined in consideration of the current location of the terminal.

Operation S6060. If detailed MBS information is not transferred to the terminal via a separate slice authentication/authorization procedure, the AMF may perform a subsequent operation to transfer additional information for the MBS to the terminal. The AMF receives an MBS security key (or an MBS service key) to be transferred to the terminal for each MBS (i.e., for each MBS identifier) provided by the network. An identifier for a specific MBS provided by the network may be a TMGI or a multicast broadcast service (MBS) ID. The AMF may receive information for the MBS service, whether the MBS service is authorized, a DNN associated with the MBS service, an NW slice ID associated with the MBS service, a multicast IP address of the MBS server, and/or the service session start time.

Operation S6070. If it is necessary to assign, to the terminal, an IP address for reception of an IP multicast (broadcast) packet, the AMF may assign an IP address to the terminal, and if there is an IP address stored in the AMF, the stored IP address may be used, or IP address assignment may be requested (MBS session request) from an NF (SMF-M or MBSMF) that manages a session for the MBS. In this case, the IP address to be assigned to the terminal may be assigned differently according to each MBS service, each subscriber, and a group to which a specific subscriber belongs. To this end, the message for requesting IP address assignment by the AMF may include one or more pieces of the aforementioned information (e.g., the MBS ID, TMGI, group ID, DNN, etc.).

Operation S6080. If the AMF requests IP address assignment from the NF (SMF-M or MBSMF) that manages an MBS session, the NF having received the request determines an IP address to be assigned to the terminal by using the subscriber/terminal information included in the request message and makes a response using the IP address (MBS session response). In this case, the IP address assigned to the terminal, which is included in the response (response message), may be configured differently for each MBS service, for each subscriber, and for each multicast group to which a specific subscriber belongs.

Operation S6090. The AMF transfers information for the MBS to the terminal by using an NAS message. For example, if the registration procedure started in operation S6010 is not completed, the AMF may transfer the information to the terminal by using a registration accept message. Alternatively, if the registration procedure is completed before performing operation S6090, the AMF may transfer the information to the terminal via the UE configuration update (UCU) procedure. The information transferred to the terminal may include at least one among the MBS identifier allowed for the terminal, the slice identifier corresponding to the specific MBS, the MBS service key, the IP address to be used by the terminal, the transmission start time, the DNN to be used if a separate session with the MBS server needs to be established, and the IP address of the multicast transmission server. Depending on an embodiment, this process may be performed in combination with the UCU performed at the end of operation S6060 to update final terminal slice information according to slice authentication.

Operations S6100 to S6110. The terminal performs an operation to receive the multicast/broadcast service by using the received information, and if it is necessary to generate a separate PDU session with the received DNN, starts a PDU session generation procedure.

Figure 7:
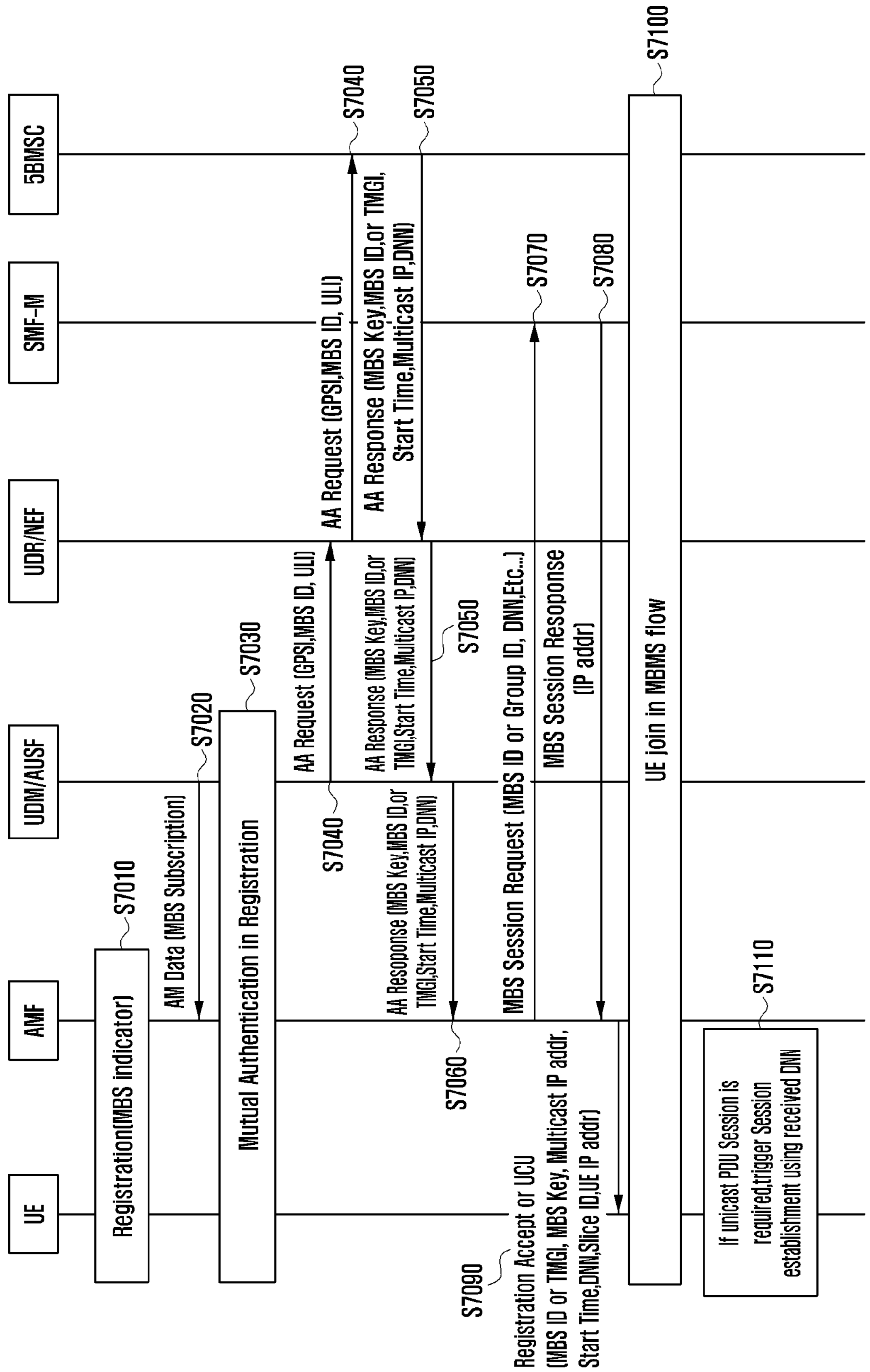
FIG. 7 is a diagram illustrating a procedure for providing MBS service information by using an MBS service authentication procedure, via an embodiment of the disclosure.

FIG. 7 is a diagram illustrating a procedure for providing MBS service information by using an MBS service authentication procedure, via an embodiment of the disclosure.

Operations S7010 to S7030 of FIG. 7 are the same as operations S3010 to S3030 of FIG. 3 and operations S6010 to S6030 of FIG. 6. Accordingly, duplicate descriptions will be omitted.

In operation S7030, this embodiment corresponds to a case in which an AMF transmits a request for authentication/ authorization for an MBS to an AUSF. In this embodiment, authentication for a 5MBS service may be included in authentication for 5G network access/registration for subscribers, and authentication between the 5G system and an MBS service provision NF may be used to transmit MBS service information (parameters).

Operation S7040. The AUSF transmits a request (AA request) for providing authentication and information on an MBS service to a terminal. If a 5BMSC providing the MBS service is directly linked to the AUSF, the AUSF requests information by directly calling an NF service provided by the 5BMSC, or if linked via an NEF, the 5BMSC requests information from the NEF. If the terminal provides a separate MBS service identifier at the time of registration request, or if the subscription information includes information enabling identification of the MBS service, the AUSF considers this, and otherwise, the AUSF selects a 5BMSC by using the subscriber's MBS user identifier (GPSI) to directly transmit a request, or if the request should be made via the NEF, the AUSF includes the information in the request message so as to enable the NEF to discover a target 5BMSC. If the request is made via the NEF, the NEF discovers the target 5BMSC by using the received information, and transmits a service information request to the 5BMSC in response to the request of the AUSF. If a location-based service control is required, the AUSF may receive location information of the terminal (user location information) from the AMF and include the same in the request message.

Operation S7050. The 5BMSC having received the request for service information or authentication for the MBS service may determine, if necessary, whether provision of the MBS service is authorized for the corresponding subscriber or user. If the location-based service control is required and location information of the terminal is received in operation S7040, the 5BMSC may determine whether to allow the service in consideration of the current location of the terminal, or may determine and transfer a service parameter in consideration of the location. The 5BMSC may transfer, as a response (AA response), information for the MBS service to the NF (NEF or AUSF) which has transmitted the request, and the information on the MBS service (MBS service information) may include an MBS service identifier (e.g., a TMGI), an MBS security key, a service session start time, an IP address to be used for multicast transmission, and/or a DNN to be used when unicast transmission is also required. If the NEF receives the corresponding information, the NEF transfers the information on the MBS service to the AUSF having transmitted the request.

Operation S7060. The AUSF may transmit the received MBS service information to the AMF via the AA response, and the MBS service information may include the MBS service identifier (e.g., the TMGI), the MBS security key, the service session start time, the IP address to be used for multicast transmission, and/or the DNN to be used when unicast transmission is also required.

Operations S7070 to S7110 are the same as operations S6070 to S6110 of FIG. 6. Accordingly, duplicate descriptions will be omitted.

Figure 8:
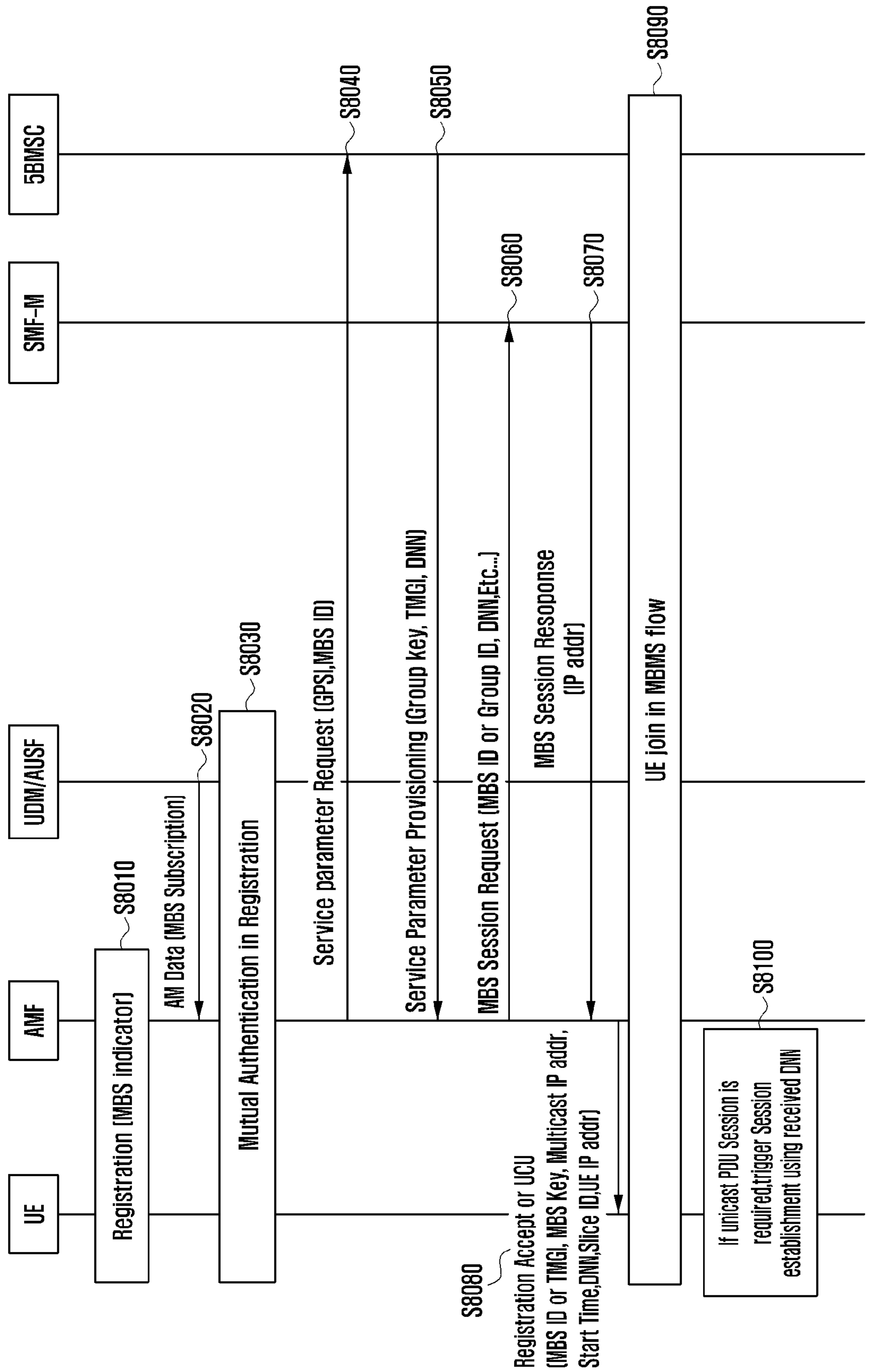
FIG. 8 is a diagram illustrating a procedure for providing MBS service information by using a control plane, via an embodiment of the disclosure.

FIG. 8 is a diagram illustrating a procedure for providing MBS service information by using a control plane, via an embodiment of the disclosure.

Operations S8010 to S8030 of FIG. 8 are the same as operations S3010 to S3030 of FIG. 3 and operations S6010 to S6030 of FIG. 6. Accordingly, duplicate descriptions will be omitted.

In operation S8030, this embodiment corresponds to a case in which an AMF directly requests, from a 5BMSC via a control plane, a procedure for receiving information on an MBS service and transferring the same to a terminal.

Operation S8040. The AMF transmits a request for providing authentication and information for the MBS service to the terminal. In this embodiment, if the 5BMSC providing the MBS service is directly linked to the AMF, the AMF directly calls an NF service provided by the 5BMSC so as to request information. If the terminal provides a separate MBS service identifier at the time of registration request, or if the subscription information includes information enabling identification of the MBS service, the AMF considers this, and otherwise, the AMF uses a subscriber's MBS user identifier (GPSI) to select the 5BMSC to be a target of the request. For this procedure, the AMF may use the information to perform, with an NRF or an SCP, a procedure for discovery and selection of the 5BMSC. If the AMF and the 5BMSC are not directly linked, that is, if the request should be made via the NEF, the AMF may include the information in the request message so as to enable the NEF to discover the target 5BMSC. If the request is made via the NEF, the NEF discovers the target 5BMSC by using the received information, and transmits a service information request to the 5BMSC in response to the request of the AMF. If a location-based service control is required, the AMF may include location information of the terminal (user location information) in the request message.

Operation S8050. The 5BMSC having received the service information request for the MBS service may transfer, as a response, the information for the MBS service to the AMF, and if the location-based service control is required and the location information of the terminal is received in operation S8040, the 5BMSC may determine whether to allow the service in consideration of the current location of the terminal, or may determine and transfer a service parameter in consideration of the location. The information on the MBS service may include an MBS service identifier (e.g., a TMGI), an MBS security key, a service session start time, an IP address to be used for multicast transmission, and/or a DNN to be used when unicast transmission is also required. If the request is received via the NEF, the 5BMSC transmits a response to the NEF, and the NEF transfers the information on the MBS service to the AMF having transmitted the request. Alternatively, the MBS server may operate as an AS to transfer or receive the information for providing of the MBS service to the 5G system in the form of a policy through a PCF. In this case, the MBS server may directly exchange information with the PCF, or may exchange the information with the PCF through the NEF, and the PCF may transfer the information again to another NF of 5GC in the form of a policy.

Operations S8060 to S8100 are the same as operations S6070 to S6110 of FIG. 6. Accordingly, duplicate descriptions will be omitted.

Figure 9:
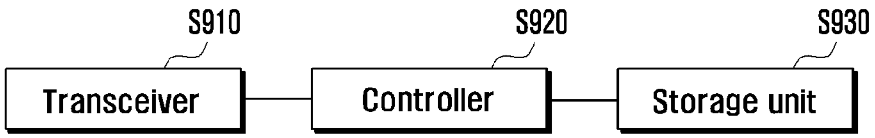
FIG. 9 illustrates a structure of a terminal according to an embodiment of the disclosure.

FIG. 9 illustrates a structure of a terminal according to an embodiment of the disclosure.

Referring to FIG. 9, a terminal may include a transceiver 910, a controller 920, and a storage unit 930. In the disclosure, the controller may be defined as a circuit, an application-specific integrated circuit, or at least one processor.

The transceiver 910 may transmit a signal to or receive a signal from another network entity. The transceiver 910 may receive, for example, system information from a base station, and may receive a synchronization signal or a reference signal.

The controller 920 may control overall operations of the terminal according to the embodiment proposed in the disclosure. For example, the controller 920 may control signal flows between respective blocks to perform operations according to the aforementioned procedures with reference to FIG. 1 to FIG. 8. For example, the controller 920 may control operations proposed in the disclosure in order to provide an MBS service in a wireless communication system according to an embodiment of the disclosure.

The storage unit 930 may store at least one of information transmitted or received via the transceiver 910 and information generated via the controller 920. For example, the storage unit 930 may store information (e.g., MBS identification information, etc.) used for providing the MBS service according to the aforementioned embodiments of the disclosure.

Figure 10:
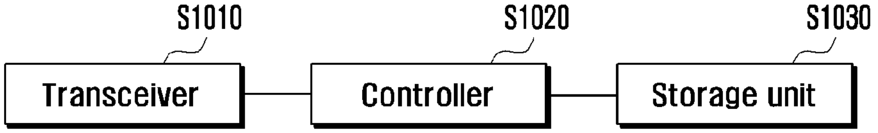
FIG. 10 illustrates a structure of a base station according to an embodiment of the disclosure.

FIG. 10 illustrates a structure of a base station according to an embodiment of the disclosure.

Referring to FIG. 10, a base station may include a transceiver 1010, a controller 1020, and a storage unit 1030. In the disclosure, the controller may be defined as a circuit, an application-specific integrated circuit, or at least one processor.

The transceiver 1010 may transmit a signal to or receive a signal from another network entity. The transceiver 1010 may transmit, for example, system information to a terminal and may transmit a synchronization signal or a reference signal.

The controller 1020 may control overall operations of the base station according to the embodiment proposed in the disclosure. For example, the controller 1020 may control signal flows between respective blocks to perform operations according to the aforementioned procedures with reference to FIG. 1 to FIG. 8. Specifically, the controller 1020 may control operations proposed in the disclosure in order to provide an MBS service in a wireless communication system according to an embodiment of the disclosure.

The storage unit 1030 may store at least one of information transmitted or received via the transceiver 1010 and information generated via the controller 1020. For example, the storage unit 1030 may store information (e.g., MBS identification information, etc.) used for providing the MBS service according to the aforementioned embodiments of the disclosure.

Figure 11:
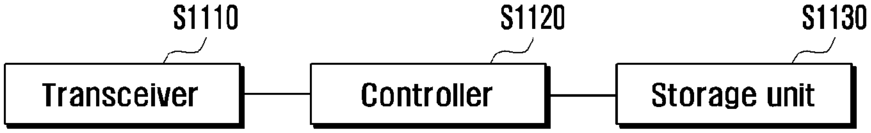
FIG. 11 illustrates a network entity structure according to an embodiment of the disclosure.

FIG. 11 illustrates a network entity structure according to an embodiment of the disclosure. The network entity of FIG. 11 may be, for example, one of the network entities of the 5G core network except for a terminal and a base station in FIG. 1 and FIG. 2. For example, the network entity may be an AMF, an SMF-M, a UPF-M, an MBSMF, an MBUPF, or the like.

Referring to FIG. 11, the network entity may include a transceiver 1110, a controller 1120, and a storage unit 1130. In the disclosure, the controller may be defined as a circuit, an application-specific integrated circuit, or at least one processor.

The transceiver 1110 may transmit a signal to or receive a signal from another network entity. The transceiver 810 may receive, for example, system information from a base station, and may receive a synchronization signal or a reference signal.

The controller 1120 may control overall operations of the terminal according to the embodiment proposed in the disclosure. For example, the controller 1120 may control signal flows between respective blocks to perform operations according to the aforementioned procedures with reference to FIG. 1 to FIG. 8. For example, the controller 1120 may control operations proposed in the disclosure in order to provide an MBS service in a wireless communication system according to an embodiment of the disclosure.

The storage unit 1130 may store at least one of information transmitted or received via the transceiver 1110 and information generated via the controller 1120. For example, the storage unit 1130 may store information (e.g., MBS identification information, etc.) used for providing the MBS service according to the aforementioned embodiments of the disclosure.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. As an example, parts of a plurality of embodiments of the disclosure may be combined with each other to operate a base station and a terminal. Further, although the above embodiments have been described based on FDD LTE systems, other variants based on the technical idea of the embodiments may also be implemented in other systems such as TDD LTE, 5G, or NR systems.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a session management function (SMF) in a communication system, the method comprising:

receiving, from an access and mobility management function (AMF), a first message comprising information on a request for establishing a protocol data unit (PDU) session for a multicast broadcast service (MBS), wherein the first message includes an identifier (ID) of a session for the MBS and current location information of a terminal;

receiving, from a unified data management (UDM), a second message comprising subscription information of the terminal, the subscription information of the terminal including information indicating whether the terminal is authorized to use the MBS and at least one MBS session ID indicating at least one MBS session that the terminal is allowed to join;

determining whether the terminal is authorized to join the session for the MBS based on the subscription information received from the UDM; and transmitting, to the terminal via the AMF, a third message as a response to the first message, the third message comprising information on a result of establishing the PDU session, wherein the third message further includes at least one ID of at least one session of the MBS, the at least one ID being determined based on the current location information of the terminal, the ID of the session for the MBS, and the at least one MBS session ID.

2. The method of claim 1, wherein the first message is received based on a selection performed by the AMF based on a data network name (DNN) for the MBS and information on a network slice for the MBS.

3. The method of claim 1, wherein the first message comprises at least one of a data network name (DNN) for the MBS or information on a slice for the MBS.

4. The method of claim 1, wherein the at least one MBS session ID comprises a temporary mobile group identity (TMGI) for the MBS.

5. A method performed by a terminal in a wireless communication system, the method comprising:

transmitting, to a session management function (SMF) via an access and mobility management function (AMF), a first message comprising information on a request for establishing a protocol data unit (PDU) session for a multicast broadcast service (MBS), wherein the first message includes an identifier (ID) of a session for the MBS and current location information of the terminal; and in case that the terminal is authorized to join the session for the MBS based on subscription information of the terminal, receiving, from the SMF via the AMF, a second message as a response to the first message, the second message comprising information on a result of establishing the PDU session, wherein the subscription information of the terminal includes information indicating whether the terminal is authorized to use the MBS and at least one MBS session ID indicating at least one MBS session that the terminal is allowed to join, and the subscription information of the terminal is retrieved from a unified data management (UDM), and wherein the second message further includes at least one ID of at least one session of the MBS, the at least one ID being determined based on the current location information of the terminal, the ID of the session for the MBS, and the at least one MBS session ID.

6. The method of claim 5, wherein the first message is transmitted based on a selection performed by the AMF based on a data network name (DNN) for the MBS and information on a network slice for the MBS.

7. The method of claim 5, wherein the first message comprises at least one of a data network name (DNN) for the MBS or information on a slice for the MBS.

8. The method of claim 5, wherein the at least one MBS session ID comprises a temporary mobile group identity (TMGI) for the MBS.

9. A session management function (SMF) in a communication system, the SMF comprising:

a transceiver; and a controller coupled with the transceiver and configured to:

receive, from an access and mobility management function (AMF), a first message comprising information on a request for establishing a protocol data unit (PDU) session for a multicast broadcast service (MBS), wherein the first message includes an identifier of a session for the MBS and current location information of a terminal, receive, from a unified data management (UDM), a second message comprising subscription information of the terminal, the subscription information of the terminal including information indicating whether the terminal is authorized to use the MBS and at least one MBS session ID indicating at least one MBS session that the terminal is allowed to join, determine whether the terminal is authorized to join the session for the MBS based on the subscription information received from the UDM, and transmit, to the terminal via the AMF, a third message as a response to the first message, the third message comprising information on a result of establishing the PDU session, wherein the third message further includes at least one ID of at least one session of the MBS, the at least one ID being determined based on the current location information of the terminal, the ID of the session for the MBS, and the at least one MBS session ID.

10. The SMF of claim 9, wherein the first message is received based on a selection performed by the AMF based on a data network name (DNN) for the MBS and information on a network slice for the MBS.

11. The SMF of claim 9, wherein the first message comprises at least one of a data network name (DNN) for the MBS or information on a slice for the MBS.

12. The SMF of claim 9, wherein the at least one MBS session ID comprises a temporary mobile group identity (TMGI) for the MBS.

13. A terminal in a wireless communication system, the terminal comprising:

a transceiver; and a controller coupled with the transceiver and configured to:

transmit, to a session management function (SMF) via an access and mobility management function (AMF), a first message comprising information on a request for establishing a protocol data unit (PDU) session for a multicast broadcast service (MBS), wherein the first message includes an identifier of a session for the MBS and current location information of the terminal, and in case that the terminal is authorized to join the session for the MBS based on subscription information of the terminal, receive, from the SMF via the AMF, a second message as a response to the first message, the second message comprising information on a result of establishing the PDU session, wherein the subscription information of the terminal includes information indicating whether the terminal is authorized to use the MBS and at least one MBS session ID indicating at least one MBS session that the terminal is allowed to join, and the subscription information of the terminal is retrieved from a unified data management (UDM), and wherein the second message further includes at least one ID of at least one session of the MBS, the at least one ID being determined based on the current location information of the terminal, the ID of the session for the MBS, and the at least one MBS session ID.

14. The terminal of claim 13, wherein the first message is transmitted based on a selection performed by the AMF based on a data network name (DNN) for the MBS and information on a network slice for the MBS, and wherein the first message comprises at least one of a data network name (DNN) for the MBS or information on a slice for the MBS.

15. The terminal of claim 13, wherein the at least one MBS session ID comprises a temporary mobile group identity (TMGI) for the MBS.

* * * * *